INVENTORS
S.M. PHELPS AND
H.C. SIBLEY
BY
Forest B. Hitchcock
THEIR ATTORNEY

Dec. 23, 1958  S. M. PHELPS ET AL  2,865,473
MOTOR AND BRAKE CONTROL CIRCUITS
Filed May 15, 1957  2 Sheets-Sheet 2

INVENTORS
S. M. PHELPS AND
H. C. SIBLEY
BY
*Forest B. Hitchcock*
THEIR ATTORNEY

United States Patent Office 2,865,473
Patented Dec. 23, 1958

2,865,473

MOTOR AND BRAKE CONTROL CIRCUITS

Stuart M. Phelps, Rochester, and Henry C. Sibley, Spencerport, N. Y., assignors to General Railway Signal Company, Rochester, N. Y.

Application May 15, 1957, Serial No. 659,407

8 Claims. (Cl. 188—62)

This invention relates in general to motor and brake control circuits, and has more particular reference to improved control means for electric motor operated car retarders of the track brake type.

In a car retarder organization having electrically operated car retarders of the track brake type such as is disclosed in the U. S. Patent to W. K. Howe, No. 1,852,572, granted April 5, 1932, in which the retarding mechanisms produce their retardation by brake shoe pressure developed by compressing a series of helical springs, the amount that such springs are compressed being regulated by a positioning mechanism driven by an electric motor and held in position by a magnetically released brake. When the positioning mechanism corresponds to a preselected control position, the electromagnetic brake holds the retarder in this position until a new position is selected. When the selected retarding period is completed, the motor is energized in a reverse direction, and drives the positioning mechanism in a reverse direction to release the retarder.

It is customary in practice to use a cumulative compound wound motor for operating the car retarder mechanism. Such a compound motor has a series winding connected so that it reinforces the shunt winding and thus gives the cumulative compound motor the operating characteristics of both a series motor and a shunt motor. That is, when the load is increased, the series turns increase the flux causing a higher torque to be developed for any given current, this high starting torque being necessary to actuate the retarder mechanism initially. On the other hand, this increase in flux also causes the speed of the motor to decrease rapidly, which characteristic provides a more positive control of the retarder.

It has been experienced, however, that when the motor is operating in the reverse direction to release the retarder while a car wheel is still present in the retarder, the helical springs, referred to above, exert a great amount of force on the positioning mechanism by virtue of the reactive forces inherent in releasing the springs from their compressed positions. These forces provide a direct mechanical assistance to the motor when the motor is operating in the reverse direction. Such additive force overspeeds the motor and increases the motor speed to such an extent that the motor no longer requires any armature current for operation. Under extreme motor acceleration, due to this mechanical assistance of the springs, the car retarder motor becomes, in effect, a generator, causing the current through the electromagnetic series brake coil, which is connected in series with the motor armature, to be reversed and energize the coil in direct opposition to a brake holding coil which is usually connected in multiple with the motor armature. When this occurs, the holding coil is no longer effective and a premature release of the brake results.

Therefore it is one object of the present invention to provide means for preventing a premature release of the electromagnetic brake by maintaining the flow of current through the series brake coil in the same direction regardless of whether the motor is operating in the forward or reverse direction.

In the usual control circuits for car retarder motors, a resistance has been provided and arranged so as to be connected in series with the motor armature so that the generated electromotive force of the armature will cause current to flow through the resistor to provide dynamic braking, such dynamic braking being used to control the speed of the motor. It should be noted that such dynamic braking is effective to control the motor speed only when the motor has been disconnected from the line so that the current through the resistance is due solely to the generated electromotive force of the motor armature. Thus, the intent and purpose heretofore has been to apply dynamic braking at a time when the motor was disconnected from its source of supply and consequently shorten the length of time and distance or angular travel to stop the motor operation in an accurate position.

In the present invention, a similar speed control function has been provided in which a dynamic governing of the motor has been made possible; but, in contrast to the usual dynamic braking, the dynamic governing disclosed herein is used to control the motor operation at a time when it is necessary to permit the motor to operate without knowing whether the motor is already subject to an applied load due to the vehicle wheels. The motor operation is, however, at all times being controlled within the limits established by the dynamic governing.

Hence, it is another object of the present invention to provide dynamic governing of an electric motor at a time when it is necessary to keep the motor operating, but to control the maximum speed attainable by the motor during any particular period of operation.

It is still a further object of this invention to prevent unnecessary applications of the electromagnetic brake, thereby reducing required maintenance and replacement of the motor brake shoes.

Other objects, purposes and characteristic features of the present invention will be in part obvious from the accompanying drawings and in part pointed out as the description of the invention progresses.

In describing the invention in detail, reference is made to the accompanying drawings in which similar and corresponding parts are identified by similar reference characters and in which.

Figure 1:
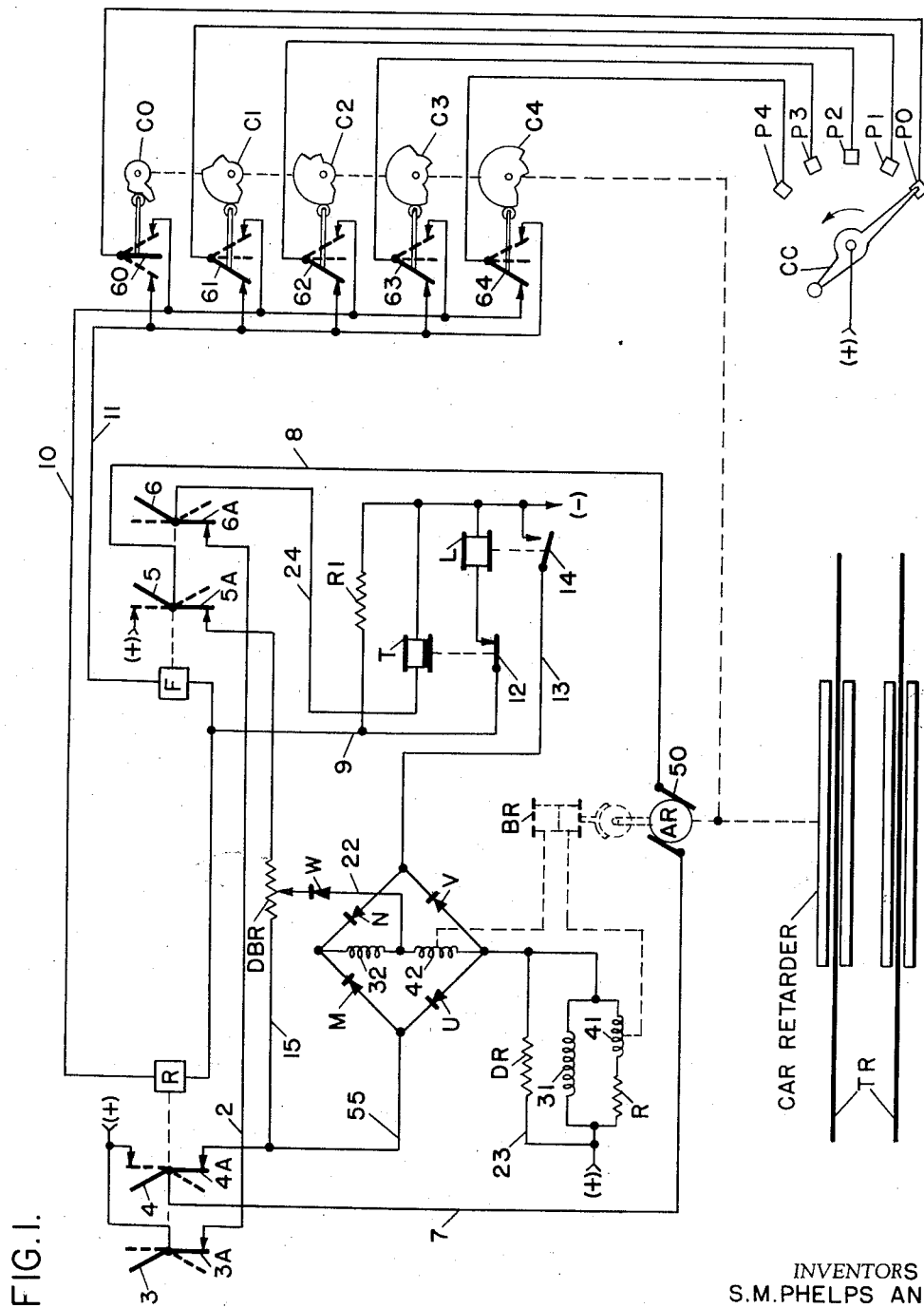
Fig. 1 is a diagrammatic illustration of an electrically operated car retarder mechanism of the track brake type, showing in detail the control circuits for the car retarder motor, such circuit arrangement being indicative of one embodiment in which the present invention may be used.
Figure 2:
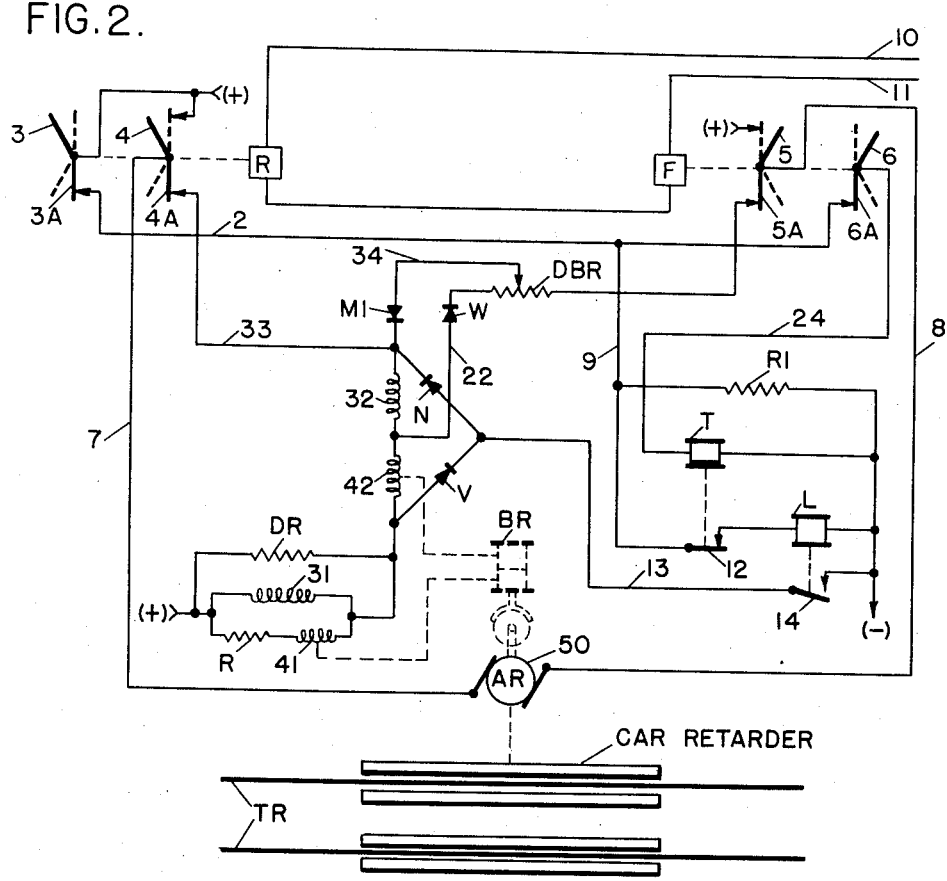
Fig. 2 is similar to Fig. 1 and indicates another form in which the present invention may be embodied.

In the diagrammatic illustrations of Fig. 1 and Fig. 2, the symbols (+) and (—) are used to indicate connections to suitable batteries or other sources of direct current.

Generally speaking, the car retarder system according to the present invention is comprised of a stretch of track having one or more car retarder mechanisms placed adjacent the respective sides of each rail, the entire system being operable to a plurality of braking positions for various degrees of retarding applications by means of an electric motor. A series of motor operated cams have been schematically shown for illustrative purposes, such cams being operated to a particular position in accordance with the desired retarder application selected by means of a circuit controller. The circuit controller shown herein has one selective position for each corresponding motor operated cam.

More particularly, rotary cams C0, C1, C2, C3, and C4, respectively, are driven by an electric motor by means of spur gearing, the cams being provided for operation of the respective adjoining ends of shoe beams and being rotated by a motor driven cam shaft, all in accordance with and as shown more in detail in the U. S. Patent to W. K. Howe, No. 2,038,112 granted April 21, 1936. The extent to which the cams are rotated determines the degree of retardation to be applied to the car wheels. The retarder operator, by means of the circuit controller which also has a cam shaft connected to and driven by the motor, can, from compiled data on the variable factors involving the computation of net rollability of a car, select the amount of retardation to be applied and actuate the proper cam operated sequence. This circuit controller includes contacts operated through various stages of rotation of the associated cam shaft so as to stop the car retarder operating cam at selected points corresponding to different degrees of retardation.

It should be understood, of course, that other manual or automatic means for selecting the amount of retardation to be applied could be used in lieu of that shown, the organization described herein being used for demonstrative purposes only without any intent to limit the scope of the present invention.

Figure 3:
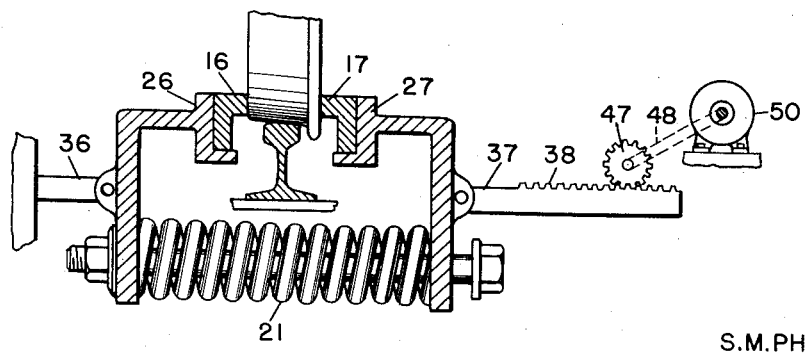
Fig. 3 is a schematic illustration of a portion of a car retarder showing typical compression springs pin connected to operating arms along with one arrangement in which a car retarder may be operated by an electric motor.

Fig. 3 of the drawings is a schematic side elevation of a portion of a typical car retarder operating unit showing how the helical spring 21 is contained between the shoe beam and the operating arm assembly, the spring 21 being initially compressed when so placed and being further compressed by the presence of train wheels. For illustrative purposes, the specific details of the structure have been omitted to simplify the explanation of the behavior of the retarder mechanism during forward and reverse operation, the specific structural details being found in the W. K. Howe patent cited above. To further simplify the illustration, the driving motor has been shown operatively connected to an operating arm by means of a spur gear, the manner and type of connecting not being an essential part of the invention disclosed herein.

It should be noted, however, that the operating arm 36 has a fixed pin connection while the operating arm 37 moves horizontally according to the direction of motor operation. At the same time, the two pivot points of the operating arms 36 and 37 are brought closer together so that the brake shoe 16 is also moved closer to the rail. Thus when the motor is being operated in the forward direction, that is, to close the retarder brake, the operating arm 37 moves the retarder brake shoe 17 toward the track rail. If now, a car wheel (as shown in Fig. 3) was to enter between the brake shoes 16 and 17, the spring 21 would be further compressed to an extent depending upon the degree of retardation to be applied and the thickness of the car wheel.

Considering now that the retardation is to be removed and the car wheel is still present between the brake shoes, the motor is energized in the reverse direction moving the operating arm 37 and consequently the brake shoe 17 away from the car wheel. It is during this phase of the operation that the spring 21 releases its compressive force. In practice the spring actually releases a compressive force so powerful that it forces the operating arm 37 to move out much more rapidly than if the motor were to accomplish such alone. Under this condition, the motor is actually being driven, the speed attained being a great deal faster than the normal operating speed required to actuate the retarder mechanism.

Experience has indicated that this mechanical assistance of the springs is of sufficient magnitude to cause the motor to operate at a speed at which no armature current is required to energize the motor. When this condition occurs, the electromagnetic brake, whose operating coil is normally connected in series with the motor armature, will be ineffective to maintain the electromagnetic brake in its released position throughout the operating cycle. Often the motor becomes overspeeded to such an extent that it is actually functioning as a generator, the motor armature generating a current which flows back to the battery or source. In the motor control circuits previously used heretofore, this reverse current energized the series brake coil and the series field of the motor in opposition to the brake holding coil and the shunt field of the motor. When this condition occurs the respective magnetic fields are in opposition and the operating characteristics are adversely affected.

More particularly, the usual electromagnetic brake has only one winding, an operating or series brake coil. A second winding, a holding or shunt brake coil, has been inserted into the circuit in accordance with the provision of this invention. The operating coil is normally connected in series with the series field winding of the retarder motor and the holding coil has been connected in multiple with the shunt field winding of the motor, the motor being of the compound-wound type. When a particular retarding position has been selected, the retarding mechanism is moved into such position by operation of the motor. At the same time the electromagnetic brake is energized by current through the holding and operating coils, the resulting magnetic flux produced by the respective coils being cumulative. Such cumulative magnetic field quickly releases the brake permitting the motor to drive the retarder mechanism to the selected position. After the proper retardation has been applied, the motor is energized in the reverse direction, the electromagnetic brake being released and effectively held released by the magnetic flux produced by the holding coil. It is during this phase of operation that the mechanical assistance of the compression springs overpeeds the motor causing the motor to have the operating characteristics of a generator, all in a manner described above. Thus when the motor is actually generating a current, the direction of current through the operating coil of the brake produces a magnetic flux which opposes the flux produced by the holding coil. Since the magnitude of the required magnetic field produced by the holding coil is established by the selected pick-up and drop-away values required for a particular operation, any substantial opposing magnetic flux will reduce the magnetic field of the holding coil below its effective value. In this instance the holding coil will no longer maintain the brake in its released position, in which event, the brake is applied prematurely. Obviously, a premature release of the electromagnetic brake will delay the retarder mechanism from being returned to a particular selected position and result in erratic retarder control.

It is proposed in the present invention to insert a plurality of rectifiers in the motor control circuit, such rectifiers being bridged across the series field winding of the motor and the operating coil of the electromagnetic brake, in series with the motor armature. Such circuit arrangement permits the flow of armature current through the series field winding and the operating coil of the brake to be maintained in a constant direction completely independent of the motor operating characteristics. With the armature current always passing through the operating coil of the brake in the same direction, the magnetic field of the operating coil will always be connected in a harmonious combination with the brake holding coil. Hence, the magnetic field of the operating coil will not cancel the magnetic field produced by the holding coil and the electromagnetic brake will be held in its desired position for the required length of time as established by the operational limits for a particular retarder application.

In actual practice, it is necessary to arrange the rectifiers only around the series brake coil which, will adequately fulfill the purpose of maintaining a release brake during the reverse cycle of operation. However, in accordance with another object of the present invention, it is expedient to include the series field of the motor in the rectifier bridge. Such improvement will cause the series field to reinforce the generator field during the period of time that the armature current is reversed and provide a dynamic governing which will hold the motor well within a controllable speed. It is also important to note that such dynamic governing is present and effective during a period in which it is necessary to keep the motor operating and still provide means to maintain the motor speed within the controllability of the brake upon cutoff.

More particularly, the usual dynamic braking is a braking action on a particular machine which is being driven by an electric motor brought about by converting the electric motor temporarily into a generator driven by that particular machine. The usual method of converting the motor into a generator is by simply disconnecting the motor from the line and connecting a resistance across the motor armature, the field being left connected for exitation from the power source. Dynamic braking is then produced since the generated electromotive force of the armature causes the current to flow through the resistance. The direction of this current will be opposite to the direction of the current forced through the armature by the supply voltage while the machine was operating as a motor. The magnetic field, of course, remains unchanged, therefore the torque produced will be retarding torque. Since the voltage will vary with the speed of the armature, the value of the retarding torque will gradually taper off to a zero value when the machine is at a standstill.

The resistance DBR shown in Figs. 1 and 2 is the usual resistance placed across the motor armature to accomplish the purposes described above and is effective to stop the motor operation providing the motor is operating at a normal speed. Such provision is old in the art and no claim to such is made herein.

It has been found, however, that when the motor is being driven by the mechanical assistance of the compression springs, and as a result, may be considered as being a generator during this phase of operation, all in a manner described above, the current generated through the series field of the compound motor, without the rectifier bridge disclosed herein, is as stated before, in opposition to the shunt field of the motor. When this condition occurs, the motor, now acting as a generator, is in effect, a very poor and inefficient generator.

Considering for a moment that the generator field remains constant, it is readily apparent that the speed of the generator becomes a direct function of the load. If, however, the generator field is reduced, as is the case when the series field opposes the shunt field as described above, the speed of the generator will increase very rapidly with only a slight increase in driving force. Thus, the additional input due to the mechanical assistance of the compression springs causes the speed of the generator to exceed the limits of controllability.

By including the series field in the rectifier bridge, so as to cause the current through the series field to remain in the same direction, even though the current has now reversed itself in both the battery and the armature, the series field will reinforce the shunt field instead of opposing it. Under this condition the speed of the generator will still increase with an increase in input due to the mechanical assistance of the springs, but, the reinforced generator field now requires a much greater input for a proportional increase in speed. It has been found in actual practice that this demand exceeds the value of input available even with the additional force due to the springs, and hence the speed of the generator cannot exceed the limits of controllability of the electromagnetic brake upon cutoff. Hence the characteristics of the series and shunt motor have been combined.

Having thus described the fundamental principles upon which the present invention is based, it is believed that a further understanding may be had by a description of the operation of the apparatus shown in the drawings.

Figs. 1 and 2 of the drawings show different forms in which the present invention may be used in connection with a car retarder system of the track brake type although it should be expressly understood that the invention is not limited to such use. The features disclosed herein are applicable in other systems in which the use of an electrical motor driven brake mechanism is used and the characteristics of the desired control are similar, as for example, in highway crossing gate apparatus.

Fig. 1 shows operating coils of the two directional contactors (not shown), the operating coil F controlling one contactor and the operating coil R controlling the other. The directional contactors have part normally open contacts 3, 4, 5 and 6, and part normally closed contacts 3A, 4A, 5A and 6A. The energization and the direction of rotation of the motor 50 is controlled by selectively energizing the contactors, the operating coil F being arranged when energized to select a direction of rotation of the motor which will increase the degree of retardation, thus applying the retarder mechanism. The operating coil R is arranged when energized to select a direction of rotation to decrease the degree of retardation, thus releasing the retarder mechanism.

The plurality of cams C0–C4 is provided to automatically deenergize the retarder motor through the directional contactors in the manner fully shown and described in the above referred to patent to W. K. Howe, however, it may be briefly stated that these cams are fixed in various relative positions on a common shaft which is rotated by the motor in accordance with the operated position of the retarder brake shoes 16 and 17 as shown in Fig. 3. Each of these cams has a high portion, an intermediate portion and a low portion which operate suitable three-position contacts respectively. When the mechanism is in any particular position, the movable contact for that position is open and the movable contacts for higher or lower numbered positions are closed. The movable contacts higher in number are closed to operating coil F and the movable contacts lower in number are closed to operating coil R. Of course, the electromagnetic brake on the motor armature holds the retarder mechanism in such particular position when the motor is not operating.

In the particular adaptation shown in Fig. 1, the retarder is shown in the open position, that is, the operating cam CO which moves the retarder to the open position as shown as having its movable contact 60 open while the movable contacts 61 through 64 of the operating cams C1 through C4 respectively, are closed. In this position, the circuit controller lever CC rests on the corresponding selected position PO. Thus, the windings of the contactors are shown in the deenergized position.

A suitable time element relay T is also provided, which relay may be any well-known type of electromagnetic device, which is arranged to close front contacts immediately upon energization but will not open its front contacts until a predetermined time has elapsed after its deenergization. The time relay T is normally energized through a circuit from (+), through back contact 3A of operating coil R, over line wire 2, back contact 6A of operating coil F, winding of relay T, to (−). When the circuit controller CC is actuated to place energy on a line wire so as to operate the car retarder in the forward direction, in which case operating coil F is energized and picks up its front contacts 5 and 6, and opening contacts 5A and 6A, all in accordance with the usual operation of directional contactors, the time relay T will be deenergized but its front contact 12 will remain closed for a predetermined time, as for example, five seconds, during which time the retarder mechanism must complete its cycle of operation in the forward direction. If the cycle of operation is completed within the timing period of the time relay T, the energy supplied to the operating coil F will be discontinued and the aforementioned contacts will return to their normal position so that the time relay T will receive energy over its usual energizing circuit described above and maintain its front contact 12 closed. If, however, the cycle of operation is not completed within the timing period of the time relay T, the dropping away of contact 12 of relay T interrupts the energizing circuit for the line relay L, said line relay being normally energized by a circuit from (+), a contact of a particular cam depending upon the operator's selection of the degree of retardation, over line wires 10 or 11, dependent upon whether the retarder is operating in the forward or reverse direction, and thus similarly through the winding of either operating coil F or R, over wire 9, contact 12 of relay T, winding of relay L, to (−). Such deenergization of the line relay L renders the retarder mechanism inoperative.

The details of the operation of the line relay L and the timing relay T have been disclosed in the U. S. Patent to W. K. Howe, No. 2,038,112, granted April 21, 1936, and it is expressly understood that no specific claim to such timing element is claimed herein.

Turning now to the operating circuit for the motor 50, the motor armature AR is connected in series with the series field 32 of the motor 50 and also in series with the series brake coil 42 of the electromagnetic brake BR. Also included in the motor circuit but connected in multiple therewith is the shunt field 31 of the motor 50 further connected in multiple with the holding coil 41 of the electromagnetic brake BR. A dissipating resistance DR has been connected in multiple with the shunt field 31, holding coil 41 and a resistance R to dissipate the shunt field of the motor 50 since the high inductive impedance developed in the brake holding coil 41 tends to block such dissipation of the shunt field.

A series of rectifiers U, M, V and N have been inserted between wires 55 and 13 and bridged across both the series field 32 and the series brake coil 42. When the motor is operating in the forward direction the energizing current for the series field and the series brake coil is from (+), through contact 5 of operating coil F, line wire 8, motor armature AR, line wire 7, contact 4A of the operating coil R, wire 55, rectifier M, series field 32, series brake coil 42, rectifier V, wire 13, and contact 14 of relay L to (−). At the same time, the energizing circuit for the shunt field 31 and the brake holding coil 41 when the motor is operating in the forward direction, is from (+), through the multiple connected shunt field 31 and brake holding coil 41, rectifier V, line wire 13, and contact 14 of relay L, to (−). When the motor is operating in the reverse direction, the energizing circuit for the series field 32 and the series brake coil 42 is from (+), through contact 4 of operating coil R, line wire 7, motor armature AR, line wire 8, back contact 5A of operating coil F, dynamic braking resistance DBR, wire 15, wire 55, rectifier M, series field 32, series brake coil 42, rectifier V, wire 13, contact 14 of relay L, to (−). Obviously the current through the shunt field 31 and the brake holding coil 41 does not change direction when the motor is shifted from forward to reverse operation.

For purposes of simplifying the explanation to follow later, it should be noted that the rectifiers M and V carry the full motor starting current regardless of whether the motor is operating in the forward or reverse direction. Further, disregarding for the time being the line wire 22 and rectifier W tapped to the dynamic braking resistance DBR, since, as explained before, the current can be maintained in the same direction without such elements, it should be noted that the dynamic braking resistance DBR is connected in series with the motor armature AR when the motor is operating in the reverse direction.

Heretofore, the motor operated normally through the forward and reverse cycles, without any rectifiers bridged across the windings of either the motor or the brake. While this arrangement is theoretically satisfactory, actual practice shows that control of the motor has been erratic when operating in the reverse direction driving force supplied by the compression springs 21 (see Fig. 3) when there are car wheels between retarder shoes. Since the number of wheels and their relative position varies rapidly under operating conditions, the control requirements also changed unpredictably. As previously explained there, such additional force would cause the motor to function as a generator during a portion of the reverse operating cycle. When this occurs, the motor is actually pumping current back in to the battery, the motor for all practical purposes acting as a source.

More specifically, this current which is being pumped back into the battery due to this condition flows from (−), contact 14 of relay L, wire 13, rectifier N, series field 32, series brake coil 42, rectifier U, wire 55, line wire 15, resistance DBR, back contact 5A, wire 8, motor armature AR, line wire 7, contact 4 of operating coil R, to (+), it being repeated that the current is considered as being reversed. It should also be obvious that such condition occurs while the operating coil R is energized and its contact 4 closed and further, considering that the rectifier W has not been placed in the circuit at this time.

Obviously, with the plurality of rectifiers arranged as shown, the direction of current through the series field 32 and the series brake coil 42 remains the same in all instances, and, since the current cannot change direction in the shunt field 31 and the holding coil 41, there can be no cancellation in flux or holding power as would normally accompany such reversal in current flow. For example, without the rectifier bridge, a change in direction of current will cause the flux produced by the series brake coil 42 to oppose the flux produced by the holding coil 41. In this event the holding coil would no longer be able to hold the electromagnetic brake in the released position, whereupon it will be applied at an improper time. With the rectifier bridge maintaining the current through the series brake coil 42 in the same direction regardless of the motor operating characteristics, there can be no opposing field, hence the holding coil 41 will continue to be effective to maintain the electromagnetic brake in the released position.

Further, if the rectifiers were not used, the current generated by the motor 50, functioning as a generator, would also change direction through the series field 32 causing the series field to also oppose the shunt field 31 thus reducing the efficiency of the generator to a value where only a small additional mechanical input is required to cause it to operate at an uncontrollable speed all in accordance with the usual generator characteristics described hereinbefore. Considering therefore the insertion of the rectifier W into the motor circuit, which rectifier W has been inserted in the line 22 connected at one end between the series field 32 and the series brake coil 42, the other end being connected at some selected point along the resistance DBR, and further, considering the motor 50 as again operating as a generator during the prescribed conditions, the flow of current through the series field 32 of the motor to add a controlling characteristic which, in reference to one feature of the present invention, has been conveniently labeled dynamic governing. With the current flowing from (−) through contact 14 of relay L, wire 13, rectifier N, series field 32, line wire 22, rectifier W, through a portion of resistance DBR, back contact 5A of operating coil F, line wire 8, armature AR, line wire 7, contact 4 of operating coil R, to (+), the current flow being reversed due to the motor 50 being temporarily converted to the generator, it will be obvious from the discussion of the usual generator characteristics described hereinbefore, that the required input to increase the generator speed will be greatly increased due to the reenforcing of the shunt field by the series field. In actual practice, this reenforcing field is enough additional field to cause the speed of the motor to stay well within a controllable range since the maximum additional driving force due to the compression springs 21 does not exceed the optimum input of the motor-generator 50.

Hence Fig. 1 of the drawings presents one arrangement showing a plurality of rectifiers arranged to prevent the field due to the series brake coil from opposing the field produced by the holding coil whereby the electromagnetic brake may be held in its desired position and, also permits the flux produced by the series field to reenforce the shunt field to provide ample speed control of the car retarder motor.

It should be noted that when the rectifier W is used as shown in the circuit arrangement, it is possible to eliminate the rectifier U since there is a completed circuit for the current to flow back to the battery over line wire 22 through rectifier W. However, in the event rectifier W is not used or if such rectifier W should fail, or further, if the line should break, then rectifier U would complete the return circuit to the battery for the reverse current when the motor is operating as a generator. The use of rectifier W without rectifier U will also permit a dynamic snubbing without holding the brake coil 41 to effect a rigid stop.

Turning now to Fig. 2 of the drawings which is another form in which the present invention may be used, it will be noted that for clarity like reference characters have been used for apparatus corresponding to similar apparatus used in Fig. 1. In this modification it will be apparent that when the motor is being operated in the forward direction, the full motor starting current does not pass through the rectifier M1 as it did through rectifier M in Fig. 1 due to the dynamic braking resistance DBR. In this arrangement, rectifier M1 need carry the motor starting current only when the motor is operating in the reverse direction, such current, of course, being of a lower value than the starting current required to operate the motor in the forward direction. This permits a substantial reduction of the temperature duty cycle on rectifier M1 and requires less material for cooling as well as lengthening the life of the rectifier being used, while still permitting the various control circuits to operate in accordance with the features described in this disclosure with regard to Fig. 1.

Thus the energizing circuit for operating the motor 50 in the forward direction is from (+), through contact 5 of operating coil F, line wire 8, motor armature AR, line wire 7, back contact 4A of operating coil R, line wire 33, series field 32, series brake coil 42, rectifier V, line wire 13, contact 14 of relay L, line wire 7, back contact 4A of operating coil 4A of operating coil R, line wire 33, series field 32, series brake coil 42, rectifier V, line wire 13, contact 14 of relay L, to (—). Similarly, the energizing circuit for operating the motor 50 in the reverse direction is from (+), through contact 4 of operating coil R, line wire 7, motor armature AR, line wire 8, back contact 5A of operating coil F, through a portion of resistance DBR, line wire 34, rectifier M1, series field 32, series brake coil 42, rectifier V, line wire 13, contact 14 of relay L, to (—).

Considering the motor 50 now operating as a generator due to the increased input from the compression springs 21 as described in detail above, the reverse current will flow from (—), through contact 14 of relay L, line wire 13, rectifier N, series field 32, line wire 22, rectifier W, full resistance DBR, contact 5A of operating coil F, line wire 8, motor armature AR, line wire 7, contact 4 of operating coil R, to (+). Hence, it is obvious from the foregoing description that both Fig. 1 and Fig. 2 have incorporated the novel features of the invention herein disclosed, since the current through the series field 32 and the brake coil 42 is maintained in the same direction regardless of the nature of the motor operation. Such control over premature release of the electromagnetic brake not only eliminates erratic retarder control but reduces wear of the motor brake shoes and the subsequent repair and replacement thereof.

Having thus described two forms in which the present invention may be used, it is to be understood that the forms were selected to facilitate in the disclosure of the invention as to its principles and mode of operation rather than to limit the number of forms it can assume, and it is to be further understood that various adaptations, alterations and modifications may be applied to the specific form shown without in any manner departing from the spirit or scope of the present invention.

What we claim is:

1. In a control system for a motor operated car retarder operatively connected through a drive mechanism to a reversible electric motor and held in position by an electromagnetic brake, said motor having an armature and also including a shunt field winding and a series field winding, said brake having an operating coil connected in series with said series field winding and a holding coil connected in multiple with said shunt field winding, circuit means for operatively energizing said windings, said circuit means including a plurality of rectifiers bridged across said series field winding and said operating coil for maintaining a flow of energy through said elements in a constant direction at all times.

2. In combination with a direct current motor operatively connected through a drive mechanism to a retarding device, an electric motor brake for holding said retarding device in a particular driven position and including a plurality of electromagnetic operating coils, said motor having series and shunt field windings being provided with a forward and reverse operating circuit for its armature, circuit means for connecting one of said operating coils in series with said series field winding, and rectifier means included in said circuit means for maintaining the flow of energy through said series field winding and said one operating coil in the same direction regardless of the operating characteristics of said motor.

3. In combination with a direct current motor operatively connected through a drive mechanism to a braking device held in a particular position by means of an electric brake having a plurality of electromagnetic operating coils, said motor having series and shunt field windings and being provided with a forward and reverse operating circuit for its armature, circuit means for connecting one of said operating coils in series with said series field winding, rectifier means included in said circuit means for maintaining the flow of energy through said series field winding and said one operating coil in the same direction regardless of the direction of operation of the motor armature, a second circuit means also including a rectifier for at times connecting said series field winding in multiple with said motor armature whereby the magnetic field produced by said series field winding at times reenforces the magnetic field due to said shunt field winding to control the speed of said motor.

4. In combination with a direct current motor operatively connected to a car retarder device through a drive mechanism and provided with a forward and reverse operating circuit, said motor including an armature and series and shunt field windings, an electric brake for holding said car retarder in its last driven position when said motor is not operating, said brake having an operating coil connected in series with said series field winding and also having a shunt coil connected in multiple with said shunt field winding, a plurality of rectifiers bridged across said series field winding and said operating coil to maintain the flow of energy through said series field winding and said operating coil in one direction at all times, a field discharge resistance connected across said shunt field winding and said shunt coil for at times dissipating the energy stored therein, a dynamic current discharge resistance connected in series with said armature and said rectifiers and also in series with said series field winding and said operating coil when said motor is operating in a reverse position, circuit means including a rectifier for also connecting said series field winding in multiple with said armature and said dynamic braking resistance when said motor is operating in the reverse direction, whereby said series field will reenforce said shunt field and control the speed of the motor.

5. In a control system for electrically operated car retarder mechanism having a track brake driven by a reversible electric motor and provided with a forward and reverse operating circuit, said motor having an armature and also series and shunt field windings, an electric motor brake for holding said track brake in its last driven position when said motor is not operating, said motor brake having an operating coil connected in series with said series field winding and a holding coil connected in multiple with said shunt field winding, fullwave rectifiers connected in series with said motor armature and said series field winding and also said operating coil when said motor is operating in the forward or reverse direction, said rectifiers maintaining the same direction of current through said series field winding and said operating coil, and a discharge resistance connected in series with said armature and said rectifiers and also in series with said series field winding and said operating coil when said motor is operating in the reverse direction.

6. In a control system for a motor operated device operatively connected through a drive mechanism to a reversible electric motor having series and shunt field windings and an armature, said motor operated device at times held in a particular position by an electric brake, said brake having an operating coil connected in series with said series field winding and a holding coil connected in multiple with said shunt field winding, rectifier means bridged across said series field winding and said operating coil for maintaining the flow of energy through said elements in constant direction at all times, circuit means including a full-wave rectifier for at times connecting said series field winding in multiple with said motor armature whereby said series field reenforces said shunt field to control the operation of the motor.

7. In combination, a reversible electric motor and a car retarder mechanism powered thereby, said elements operatively connected by a driving mechanism and having a forward and reverse operating circuit selectively controlled through a plurality of operating cams, an electromagnetic brake for holding said retarder mechanism in a particular driven position when said motor is not operating, said motor having series and shunt field windings and an armature, said electromagnetic brake having a series brake coil connected in series with said series field winding and a brake holding coil connected in multiple with said shunt field winding, a plurality of rectifiers bridged across said series field winding and said series brake coil and connected in series with said armature to maintain the energization of said windings in a constant direction, a snubbing circuit including a dissipating resistance for connecting said dissipating resistance in series with said plurality of rectifiers and also in series with said series field winding and said series brake coil when said motor is operating in its reverse position, circuit means including a fullwave rectifier for at times connecting said series field winding in multiple with said dissipating resistance and said motor armature whereby said series field reenforces said shunt field to provide additional motor speed control.

8. In combination with a compound-wound direct current motor operatively connected to a car retarder through a drive mechanism and provided with a normal and reverse operating circuit for moving the car retarder to preselected positions of retardation, braking means for retaining said car retarder in one of said preselected positions when said motor is not operating, said motor having series and shunt field windings and an armature, said braking means having a holding coil connected in multiple with said shunt field winding and an operating coil connected in series with said series field winding, said operating circuit including a plurality of rectifiers for maintaining the current through said operating coil and said series field winding in a constant direction regardless of the operating characteristics of said motor, circuit means including a fullwave rectifier for at times connecting said series field winding in multiple with said motor armature to provide additional motor speed control.

References Cited in the file of this patent
UNITED STATES PATENTS
2,801,711   Field _____ Aug. 6, 1957